(12) United States Patent
Streit et al.

(10) Patent No.: US 8,479,396 B2
(45) Date of Patent: Jul. 9, 2013

(54) METHOD FOR HARDENING RUNNING SURFACES OF ROLLER BEARING COMPONENTS

(75) Inventors: Edgar Streit, Poppenlauer (DE); Oskar Beer, Landshut (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 450 days.

(21) Appl. No.: 12/302,370

(22) PCT Filed: May 23, 2007

(86) PCT No.: PCT/DE2007/000932
§ 371 (c)(1),
(2), (4) Date: Nov. 25, 2008

(87) PCT Pub. No.: WO2007/137557
PCT Pub. Date: Dec. 6, 2007

(65) Prior Publication Data
US 2010/0058592 A1  Mar. 11, 2010

(30) Foreign Application Priority Data
May 30, 2006  (DE) .......................... 10 2006 025 008

(51) Int. Cl.
*B21D 53/10* (2006.01)
*C23C 8/00* (2006.01)

(52) U.S. Cl.
USPC ............... 29/898.13; 29/898.066; 29/898.04; 29/898.14; 148/228; 148/232

(58) Field of Classification Search
USPC ............. 29/898.04, 898.066, 898.13, 898.14; 148/228–238
See application file for complete search history.

(56) References Cited

U.S. PATENT DOCUMENTS

| | | | | |
|---|---|---|---|---|
| 3,399,085 | A | * | 8/1968 | Knechtel et al. .............. 148/230 |
| 3,912,551 | A | * | 10/1975 | Araya ........................... 428/682 |
| 6,179,933 | B1 | | 1/2001 | Dodd et al. |
| 2005/0268990 | A1 | | 12/2005 | Chin et al. |
| 2006/0278254 | A1 | * | 12/2006 | Jackson ......................... 134/21 |
| 2007/0071630 | A1 | * | 3/2007 | Fukuhara et al. .............. 419/13 |

FOREIGN PATENT DOCUMENTS

| | | |
|---|---|---|
| DE | 41 10 114 A | 10/1991 |
| DE | 196 44 153 | 4/1998 |
| EP | 0 067 098 | 12/1982 |
| EP | 1 001 040 A | 5/2000 |

OTHER PUBLICATIONS

B. Larisch, U. Brusky, H.J. Spies, Plasma nitriding of stainless steels at low temperatures, 1999, Surface and Coatings Technology, 116-119, pp. 205-211.*
Machine Translation of EP0067098 (A1).*
Larisch B., Brusky U., Spies H.J.: "Plasma Nitriding of Stainless Steel at Low Temperatures" Surface and Coatings Technology vol. 116-119, Sep. 1, 1999, pp. 205-211 XP002491863 p. 205, paragraph 1—p. 207, paragraph 3.1, Figure 1, Table 1.
Carpenter Technology Corporation/Carpenter Steel Division (USA) Pyrowear 675 Stainless (P675) company brochure Stainless Steels 681-96-4M.
Latrobe Steel Company, USA company brochure Carurizing Stainless Steel (CSS) CSS-42L.
Aubert & Duval Holding, France, Steel CX13VD.

* cited by examiner

*Primary Examiner* — Sarang Afzali
(74) *Attorney, Agent, or Firm* — Lucas & Mercanti, LLP (57) ABSTRACT

A method for hardening running surfaces of roller bearing components, in particular outer bearing rings. In order to provide the edge area (functional layer) of the roller bearing components with a deep layer which is particularly hard and resistant to corrosion, the roller bearing component undergoes nitration for a long period of time at a temperature of between 450 and 650° C. for at least 25 hours. During treatment no carburizing and subsequently no quenching takes place.

8 Claims, 9 Drawing Sheets

Fig. 10

METHOD FOR HARDENING RUNNING SURFACES OF ROLLER BEARING COMPONENTS

This application is a 371 of PCT/DE2007/000932 filed May 23, 2007, which in turn claims the priority of DE 10 2006 025 008.7 filed May 30, 2006, the priority of both applications is hereby claimed and both applications are incorporated by reference herein.

FIELD OF THE INVENTION

The invention relates to the field of producing components, in particular bearing rings, for rolling bearings, which are designed for particularly critical and highly stressed uses, in particular especially for application in aviation and space flight. Such rolling bearings are exposed to extraordinarily high stresses during operation, and must have a reliable and maximally wear-free operating behavior even under high ambient or operating temperatures with high rolling and sliding stress between the rolling bodies per se and the associated running races. Furthermore, increased corrosion resistance is desired in various applications.

BACKGROUND OF THE INVENTION

Such highly loadable rolling bearings often have considerable dimensions in the running race diameter of the rolling bearing outer ring. Even a relatively minor distortion of the rolling bearing ring during the heat treatment has a considerable effect, and may necessitate expensive mechanical finishing. Furthermore, the material removal over the circumference may be nonuniform in the event of ovality.

Rings for such applications are preferably made from high-alloy case-hardened steels. Such high-alloy case-hardened steels are marketed for example by Carpenter Technology Corporation/Carpenter Steel Division (USA) under the known brand name Pyrowear 675 Stainless (P675), and are described in the company brochure Stainless Steels 68.2-96-4M and with the following typical composition:
Carbon: 0.07%
Manganese: 0.65%
Silicon: 0.40%
Chromium: 13.00%
Molybdenum: 1.80%
Cobalt: 5.40%
Nickel: 2.60%
Vanadium: 0.60%
Iron: remainder.

Another steel suitable for such uses is available under the designation Carburizing Stainless Steel (CSS) CSS-42L from the Latrobe Steel Company, USA, and according to the company brochure has the following typical composition:
Carbon: 0.15%
Manganese: N/A
Silicon: N/A
Chromium: 14.00%
Molybdenum: 4.75%
Cobalt: 12.50%
Nickel: 2.00%
Vanadium: 0.60%
Iron: remainder.

Another suitable high-alloy case-hardened steel is known under the designation CX13VDW of the manufacturer Aubert & Duval Holding, France, and has the following typical composition:
Carbon: 0.12%
Manganese: N/A
Silicon: N/A
Chromium: 12.00%
Molybdenum: 1.60%
Cobalt: 0
Nickel: 2.50%
Vanadium: 0.30%
Iron: remainder.

U.S. Pat. No. 6,179,933 discloses rolling bearing components carrying rolling bodies—for example for use in aircraft engines—made of high-alloy case-hardened steels (for example the aforementioned Pyrowear 675), which have a specially hardened running surface for the rolling bodies owing to an additional heat treatment of the prehardened steel.

To this end, the rolling bearing component, already prehardened by conventional carburizing known per se and subsequent quenching, is subjected for a short time to a subsequent nitriding treatment (also referred to below as nitriding for brevity). Temperatures in the range of from 375° to 592° C. are proposed, to which the rolling bearing component is exposed in short-term nitriding for from 1 to 2 hours. A very thin, additionally hardened layer of up to 150 μm is thereby formed, with a Vickers hardness of from 800 to 1200 HV 0.3. This layer serves to counteract the customarily increased wear of the running surface during operating startup, or running in.

As mentioned, the high-alloy case-hardened steel must be subjected to a carburizing process known per se in order to generate a surface hardness and layer thickness sufficient for continuous operation. To this end, the case-hardened steel is exposed to carbon at relatively high temperatures of about 850° C. to 1050° C. in an atmosphere containing carbon, and subsequently quenched. Carbon atoms diffuse into the marginal layer of the steel, which itself has only a relatively low carbon content and is therefore not hardenable per se. Below the marginal layer, the steel furthermore desirably remains relatively low in carbon and therefore relatively ductile. The carbon diffusing in is substantially accommodated between the atoms in the lattice of the case-hardened steel. Owing to the quenching, the carbon atoms remain in constrained positions in the atomic lattice of the steel and therefore lead to the hardness increase, while with slower cooling they occupy energetically favorable positions in the lattice without causing a substantial hardness increase.

By pure carburizing, the hardness in the relevant marginal zone (also referred to below as the functional layer) of the rolling bearing component is limited conventionally to less than 1000 HV, the hardness being associated with the formation of relatively large carbides. These reduce the rolling strength. Particularly in the high-tempered state (with a tempering temperature of about 500° C.), the rolling bearing component's corrosion resistance of the surface hardened only by carburizing is low.

Patent Application US 2005/0268990 A1 discloses a heat treatment for case-hardened steel, in particular bearings for aeronautical and astronautical applications, which is likewise based on the previously described carburizing with the problems described above. As US 2005/0268990 A1 describes with the aid of its exemplary embodiments, here again it is possible to use the case-hardened steel Pyrowear 675 which is initially processed mechanically to form the desired bearing component. The bearing component is subsequently carbonitrided. During this carbonitriding process, the bearing component is exposed to a gas mixture having carbon and nitrogen components in a temperature range of from 898° C. to 1093° C. (1650° F. to 2000° F.) for from 40 to 200 hours. The rolling bearing component must subsequently be subjected to quenching, as described above in connection with pure carburizing. This raises the problems explained in the introduction, particularly with respect to dimensional accuracy of the rolling bearing component. During the subsequent mechanical material removal to (re)produce the dimensional accuracy, it is then necessary to remove a relatively thick layer.

Against this background, it is an object of the present invention to provide a method for hardening running surfaces of rolling bearing components, in particular outer bearing rings, with which the rolling bearing component has a layer of particular hardness and corrosion strength in its marginal zone (functional layer).

It is another object of the invention to produce this functional layer in such a way that elaborate subsequent mechanical processing, associated with high material removal, is no longer necessary.

SUMMARY OF THE INVENTION

The present invention relates to a method for hardening running surfaces of rolling bearing components, in which the rolling bearing component is subjected to long-term nitriding which is carried out at a temperature of between 450° C. and 650° C. for a duration of at least 25 hours During this treatment, no carburizing and no subsequent quenching takes place.

The present invention therefore departs from the approach of short-term nitriding as presented in the previously known prior art, so as to provide an already prehardened case-hardened steel for operational running in with a very thin, additionally hardened running-in layer on its running surface. Conversely, the method according to the invention adopts an entirely new approach by providing a nitriding treatment time of at least 25 hours at from 450° C. to 650° C., which is comparatively long compared with the previously known prior art. During this heat treatment time, the nitrogen atoms can penetrate much more deeply into the material of the rolling bearing component and therefore generate a hardened functional layer with a layer thickness of up to 1 mm, preferably up to 0.75 mm.

Another essential aspect of the invention is that no carburizing takes place during the long-term nitriding, and no temperature-related quenching of the rolling bearing component takes place after the end of the nitriding heat treatment. The material loads associated with quenching, and corresponding material distortion, are therefore avoided. When using the method according to the invention, therefore, the rolling bearing component does not therefore subsequently have to be subjected to mechanical finishing, or has to be subjected only to slight mechanical finishing.

As a result, the method according to the invention produces a functional layer with an extremely hard upper marginal layer, in which there are very high compressive internal stresses, on rolling bearing components made of high-alloy case-hardened steels. The rolling strength of the functional layer is therefore increased very considerably.

According to an advantageous configuration of the method according to the invention, the duration of the heat treatment or nitriding is at least 25 hours.

The nitriding may in principle be carried out by so-called gas nitriding. A certain problem with gas nitriding consists in the so-called passive layer, which usually consists of a thin oxide layer and makes it more difficult for the nitrogen atoms to penetrate into the material of the rolling bearing component. This passive layer is relatively difficult to overcome by gas nitriding alone.

Against this background, according to an advantageous refinement of the invention the rolling bearing component is subjected to long-term plasma nitriding. During the plasma nitriding, in an advantageous refinement of the invention, two steps of surface treating of the rolling bearing component are carried out successively in order to improve the method result, namely first cleaning and activating the surface and subsequently the actual nitriding.

For example, the surface of the rolling bearing component to be treated is initially cleaned for about 30 minutes by gas atoms (for example argon) bombarded onto the surface. Owing to their high mass, argon atoms cause very effective cleaning of the surface. Subsequently, for the plasma formation and the actual nitriding, a process gas mixture of nitrogen, hydrogen and a (lower) argon proportion may be used and the surface of the rolling bearing component exposed to this process gas. A pressure of from 3 to 10 mbar is preferably set up here, which ensures a particularly stable plasma.

During the plasma nitriding, the rolling bearing component is preferably arranged on a baseplate at an electrical potential, which has a potential or voltage difference of from 400 to 800 V relative to the oven wall. In the nitriding oven, the essential voltage drop then takes place within a few millimeters directly on the component surface of the rolling bearing component, which results in a very high field strength that leads to ionization of the gas components of the process gas and therefore to plasma formation.

The rolling bearing component is preferably exposed to this situation for at least 50 hours, so that said hardened functional layer with a thickness of advantageously up to 1 mm is obtained by the long-term plasma nitriding.

The inventive long-term nitriding gives a sufficiently thick, hard marginal layer, for example typically more than 1000 HV, in which case the corrosion and rolling strength can be significantly improved and/or the formation of pitting corrosion can be prevented. Furthermore, considerable compressive internal stresses of typically more than 400 MPa are desirably formed in the marginal layer.

According to an advantageous embodiment of the invention, the functional layer to be hardened is furthermore carburized in a manner known per se before the long-term nitriding. The rolling bearing component may advantageously already be brought substantially to the specified dimensions after the carburizing and the subsequent quenching because—as described above—at worst only very minor component distortion is entailed by the subsequent long-term nitriding. After the subsequent long-term nitriding, the rolling bearing component may then be finished to size, and undesired slight surface roughness due to the nitriding may thereby be removed.

Said combination of conventional carburizing and subsequent long-term nitriding gives a significantly thick, hard marginal layer, the corrosion and rolling strength being significantly improved. Furthermore, considerable compressive internal stresses are desirably formed in the marginal layer, which are typically more than 500 MPa. The hardness increase in the functional layer (i.e. in the nitriding zone) takes place without formation of undesired coarse hard phases (carbides). The nitrogen content in the nitriding zone is preferably more than 1%.

BRIEF DESCRIPTION OF THE DRAWINGS

The invention will be further explained by way of example below with the aid of a drawing, the special embodiments and examples represented not implying any limitation of the invention.

DETAILED DESCRIPTION OF THE INVENTION

Figure 1:
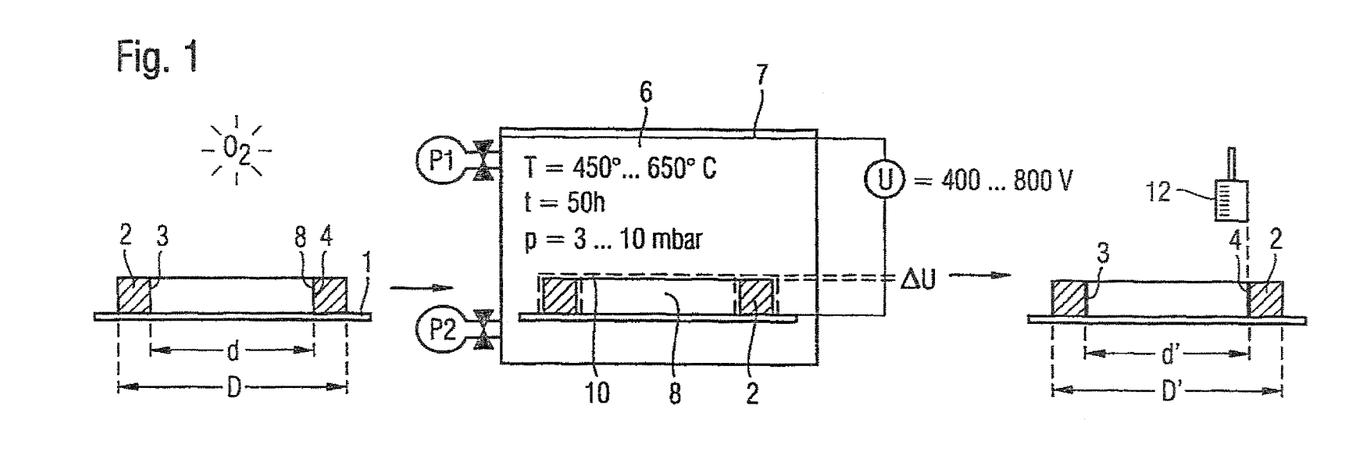
FIG. 1 schematically shows the sequence of a first exemplary embodiment of the method according to the invention.

FIG. 1 shows, on a support 1, a rolling bearing component 2 in the form of an outer bearing ring with a running surface 3. The running ring 2 has an internal diameter d (for example 250 mm) and an external diameter D.

Such rolling bearing rings for use in critical applications, for example in aeronautical and astronautical engineering, particularly with sliding stresses between the rolling bodies and running surface 3, are conventionally made from high-alloy case-hardened steels such as P675, for example, and are configured for high operating or application temperatures with an increased corrosion risk. In order to provide the rolling bearing ring 2 with a hardened marginal layer 4 (also referred to below as a functional layer) below its running surface 3, the bearing ring is subjected to long-term nitriding by the method according to the invention. This is particularly preferably configured as plasma nitriding. To this end a nitriding oven 6 is provided with corresponding oven walls, the upper of which is given the reference 7. Since the bearing ring 2 may have a thin albeit passivated surface 8, for example owing to oxidation by oxygen $O_2$ in the surrounding air, the surface 8 is preferably cleaned first. To this end the bearing ring 2 is introduced into the oven 6 and then the closed oven 6 is initially filled with a first process gas P1, which for example predominantly consists of argon. By applying a voltage U of for example 400-800 V between the bearing ring 2 and the oven walls, a potential difference and therefore an electric field is generated. The gas atoms accelerated onto the bearing ring 2 lead to the breakup and removal of the perturbing surface layers, in particular said oxide layer. The cleaning process may—depending on the parameters which are set—last for example 30 minutes.

The oven 6 is subsequently evacuated and a second process gas P2 is then introduced into the oven 6 at a considerably low pressure. The process gas P2 comprises nitrogen and hydrogen as its essential components and may additionally contain noble gases, for example argon. The addition of argon may advantageously ensure continued cleaning of the surface 8 during the long-term nitriding which now takes place.

Assisted by corresponding evacuation, the principal voltage drop is formed in the vicinity of the surface 8 of the bearing ring 2 in a so-called glow discharge 10, which is formed only a few millimeters above the component surface. There, with a low pressure p of preferably from 3 to 10 mbar, a stable plasma is generated. This plasma is maintained at temperatures T of 450-650° C. for a time t of at least 25 hours, preferably at least 50 hours and at most 100 hours. During this time, the nitrogen present in atomic form in the plasma diffuses into the surface 8 of the component 2 to a depth of at most about 1 mm.

Subsequently (represented on the right in FIG. 1) the component 2 has the desired hardened marginal layer (functional layer) 4, so that the running surface 3 not only is hardened so as to reduce wear, but is also formed highly corrosion-resistant owing to the positive effects of the nitriding. This is because the structure in the region of the layer 4 is characterized by considerable compressive internal stresses, which significantly increase the rolling strength.

In order to remove any roughness of the running surface 3 due to the nitriding treatment, slight mechanical surface finishing may be provided with a polishing tool 12. Compared with the finishing required in the event of carburizing and subsequent quenching to (re)produce the desired geometry of the bearing ring 2, only comparatively minor material removal is necessary here in order to match the resulting diameter d' to the desired setpoint diameter.

Figure 2:
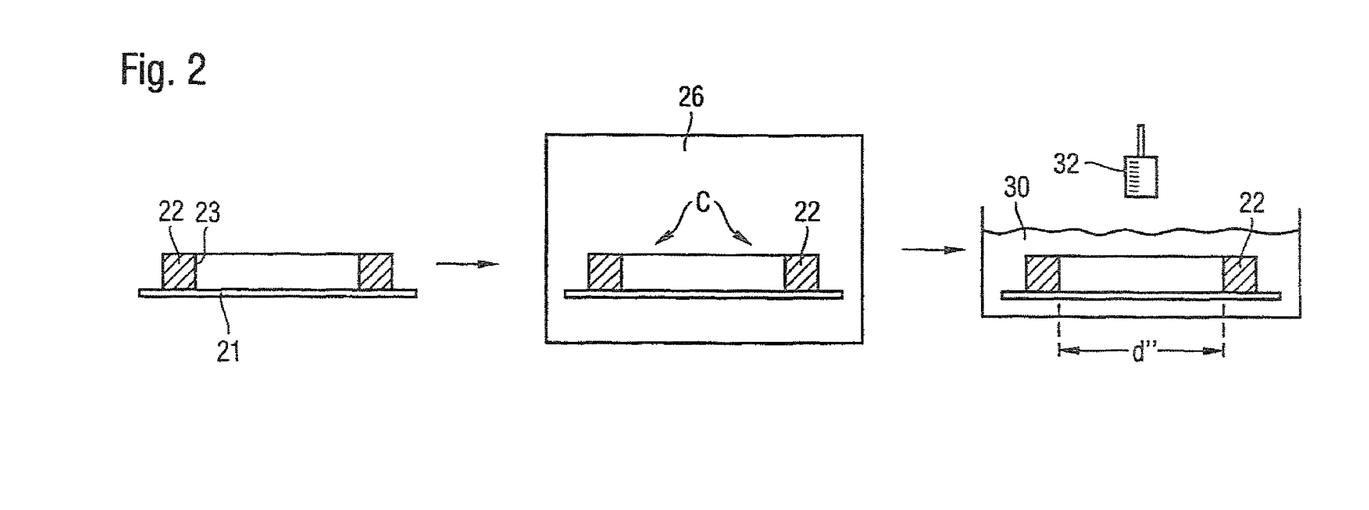
FIG. 2 shows the carburizing and quenching process preceding the sequence q according to FIG. 1 in a modification of the invention.

FIG. 2 shows a modification of the method according to the invention, in which the long-term nitriding treatment is preceded by carburizing and quenching the functional layer to be nitride-hardened.

To this end a rolling bearing component (bearing ring) 22 is placed on a support 21, and its running surface 23 is initially heated in a carburizing oven (by heating the entire bearing ring 22) to temperatures of more than 1000° C. in an atmosphere containing carbon (indicated by "C"). The carbon diffuses into the lattice structure of the case-hardened steel (for example P675) to a depth of several millimeters.

The bearing ring 22 is subsequently quenched in a quenching bath 30, so that the carbon atoms remain in constrained positions in the lattice structure of the case-hardened steel and lead to the hardness increase. This generally causes relatively large distortion, which must be corrected at this stage of the method by corresponding mechanical finishing, indicated by a grinding tool 32. In particular, the contours which are sometimes considerably noncircular after the quenching are brought to the correct diameter, which, except for a small oversize, corresponds to the desired setpoint diameters. The bearing ring 22 is subsequently treated further as described in connection with FIG. 1.

Figure 3:
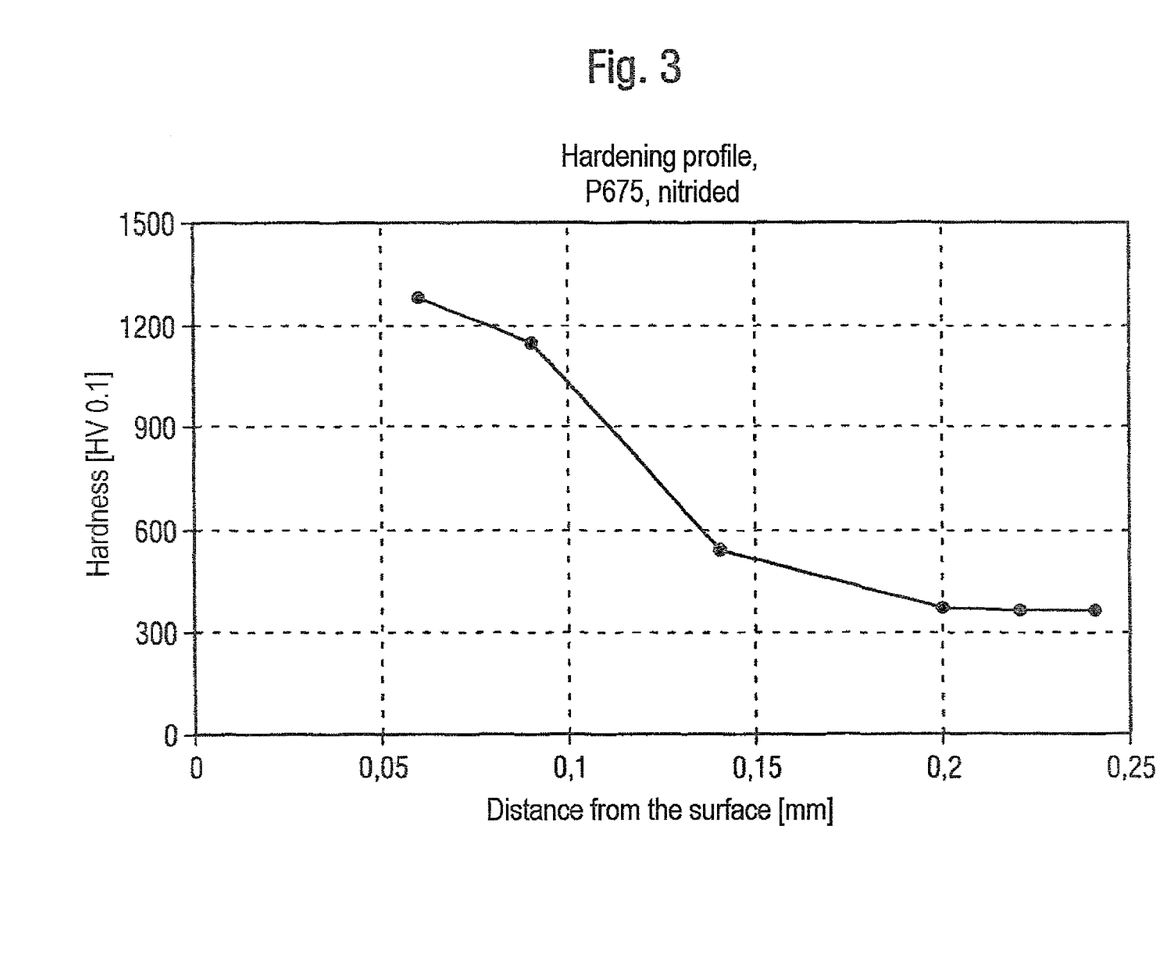
FIG. 3 shows the hardness profile of a functional surface formed by the method according to the invention, on a high-alloy case-hardened steel without prior carburizing.

FIG. 3 shows the hardness profile of a rolling bearing ring hardened by the method according to the invention in the first alternative configuration (i.e. without prior carburizing and quenching/cf. FIG. 1). The Vickers hardness (HV 0.1) is shown in FIG. 3 as a function of the distance from the surface [in mm] (0.1 denotes the 0.1 kg load setting of the testing diamond). For this, in a section prepared from the bearing ring, the Vickers hardness is respectively measured at the specified distance points on the section surface extending perpendicularly to the running surface, and is plotted on the ordinate. A hardened marginal layer (functional layer) with a depth of approximately 0.18 mm can be seen, in which the hardness is 50 Vickers more than the hardness of base material. An increased hardness is therefore generated in a notable layer thickness, which cannot be achieved either with the hardening known per se by carburizing and quenching, with a maximum hardness of less than 1000 HV, or with the short-term nitriding known from U.S. Pat. No. 6,179,933 with a maximum thickness of less than 0.15 mm for the functional layer.

Figure 4:
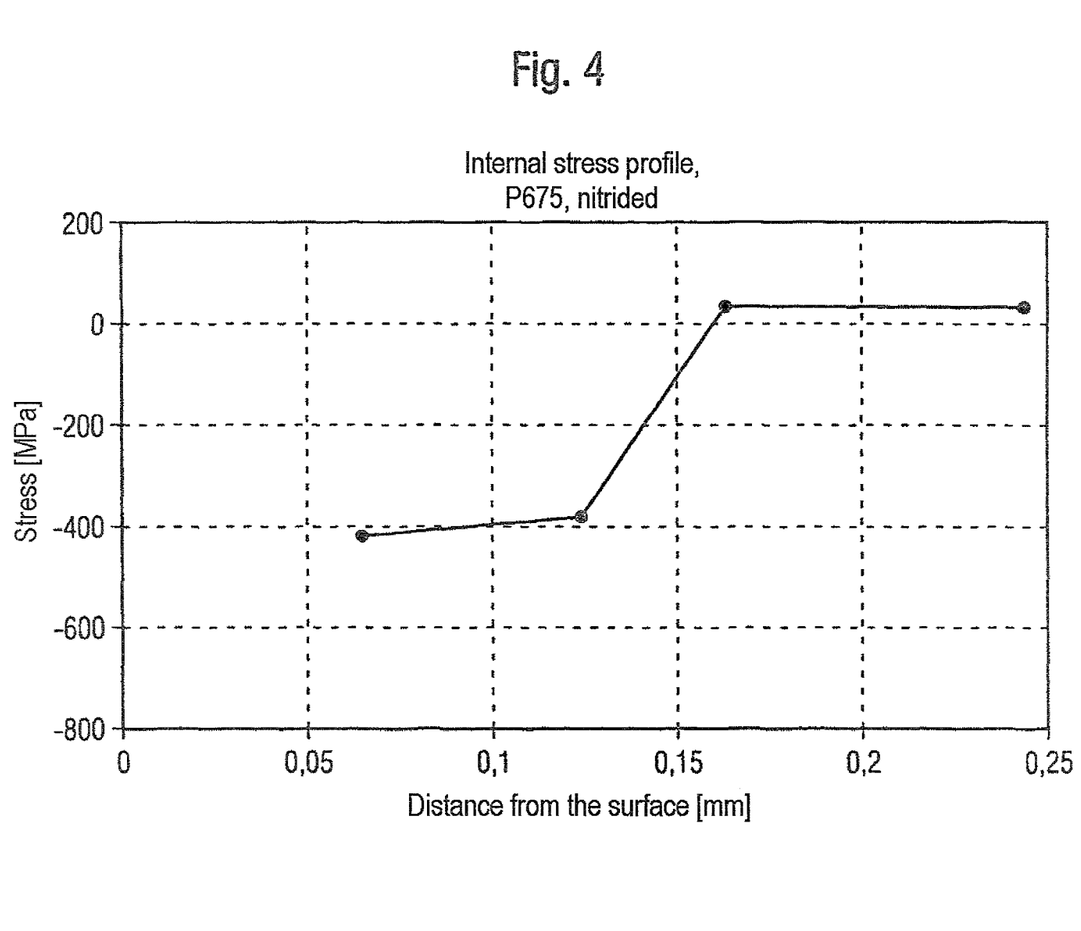
FIG. 4 shows the profile of the compressive internal stresses generated in the functional surface on a high-alloy case-hardened steel without prior carburizing.

In FIG. 4, the internal stress profile inside the functional layer is plotted on the ordinate as a function of the distance [in mm] from the surface for the exemplary embodiment described above. The stress [MPa] plotted as compressive stress with a negative sign (i.e. conventionally) on the ordinate achieves a considerable initial value of more than 400 MPa in the case-hardened steel P675 used by way of example, which is not transformed into the approximately stress-free range until below a layer thickness of 0.15 mm. Such a high internal stress in the critical layer region of the running surface likewise cannot be achieved by the known methods.

Figure 5:
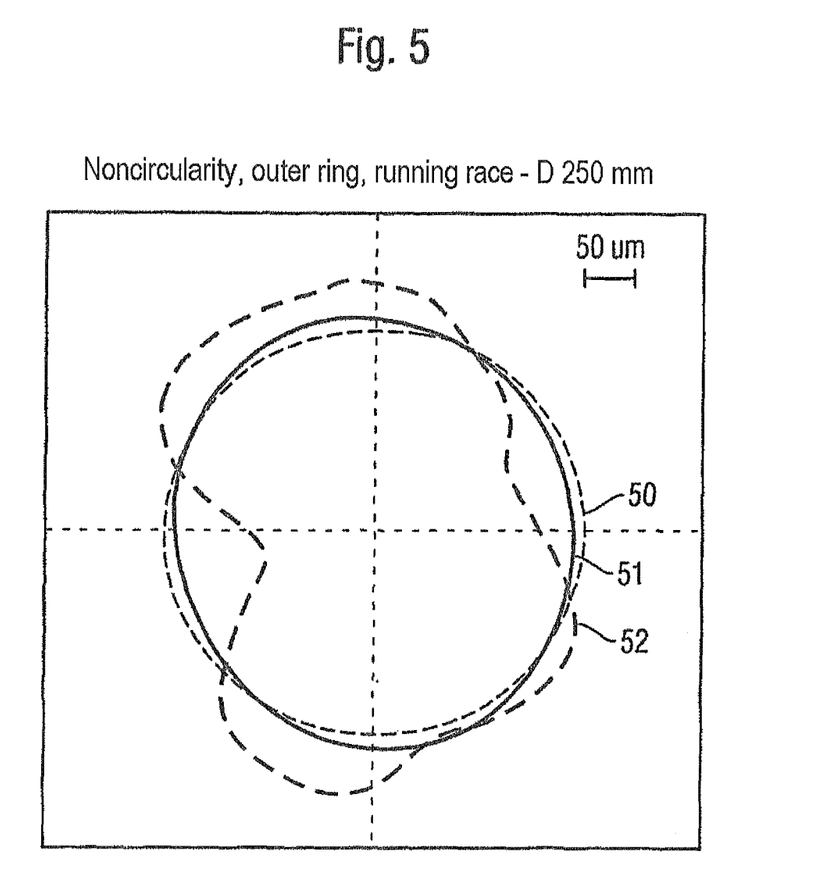
FIG. 5 shows a comparison of the distortion of a rolling bearing component with treatment according to the prior art described in the introduction, on the one hand, and the method according to the invention on the other hand.

FIG. 5 illustrates the extremely small distortion after completion of the long-term nitriding method according to the invention for the first exemplary embodiment using the steel P675 for a bearing ring with an internal diameter (running race diameter) of D=250 mm. The ideal circular shape 50 of the running surface (cf. FIG. 1) is represented here as a dotted circle. The deviation from this ideal geometry in a bearing ring made of the stainless steel P675 treated according to the invention is represented as a solid line 51. Taking into account the representation scale of the deviation from the ideal shape, it may be seen from FIG. 5 that there is at most a deviation of a few micrometers.

For comparison, the distortion of a bearing ring with the same geometry after carburizing and subsequent quenching is represented in contrast by a dashed line 52. It may be seen that the distortion occurring here turns out clearly to be in the range of 50 μm and therefore about a factor of 10 higher.

The following FIGS. 6 to 10 represent structural micrographs and sample studies of a bearing ring made of the case-hardened steel P675, which was initially carburized and quench-hardened and subsequently subjected to a long-term nitriding method.

Figure 6:
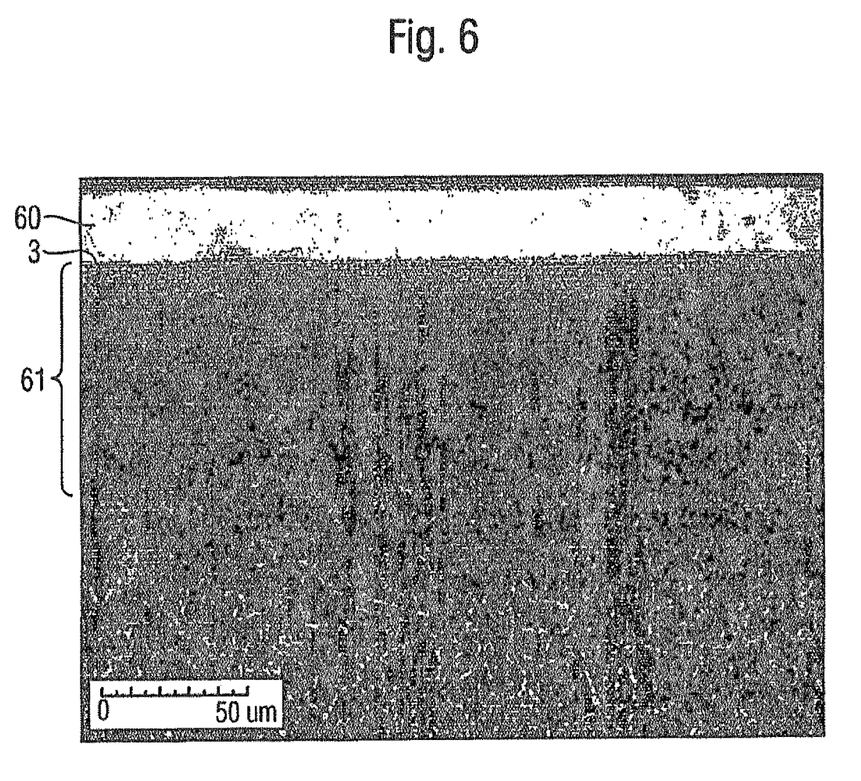
FIG. 6 shows the structural configuration in a functional surface of a rolling bearing component, produced according to a second exemplary embodiment of the invention.

FIG. 6 shows a micrograph of a material sample of a bearing ring applied on a preparation aid in the form of an aluminum layer 60. The micrograph is perpendicular to the running surface and shows a relatively low-carbide region 61 below the running surface 3, in which the carbides formed during the carburizing has been partially eliminated by the subsequent introduction of nitrogen. Although the nitrogen introduced forms nitrides itself, these are however very finely distributed and therefore not visible in this micrograph. The fine distribution of the nitrides and the elimination of the carbides improve the properties of the case-hardened steel, and in particular increase its rolling strength and corrosion resistance. A somewhat stronger accumulation of carbides can be seen in the lower part of the structure, the material structure overall being formed very homogeneously.

Figure 7:
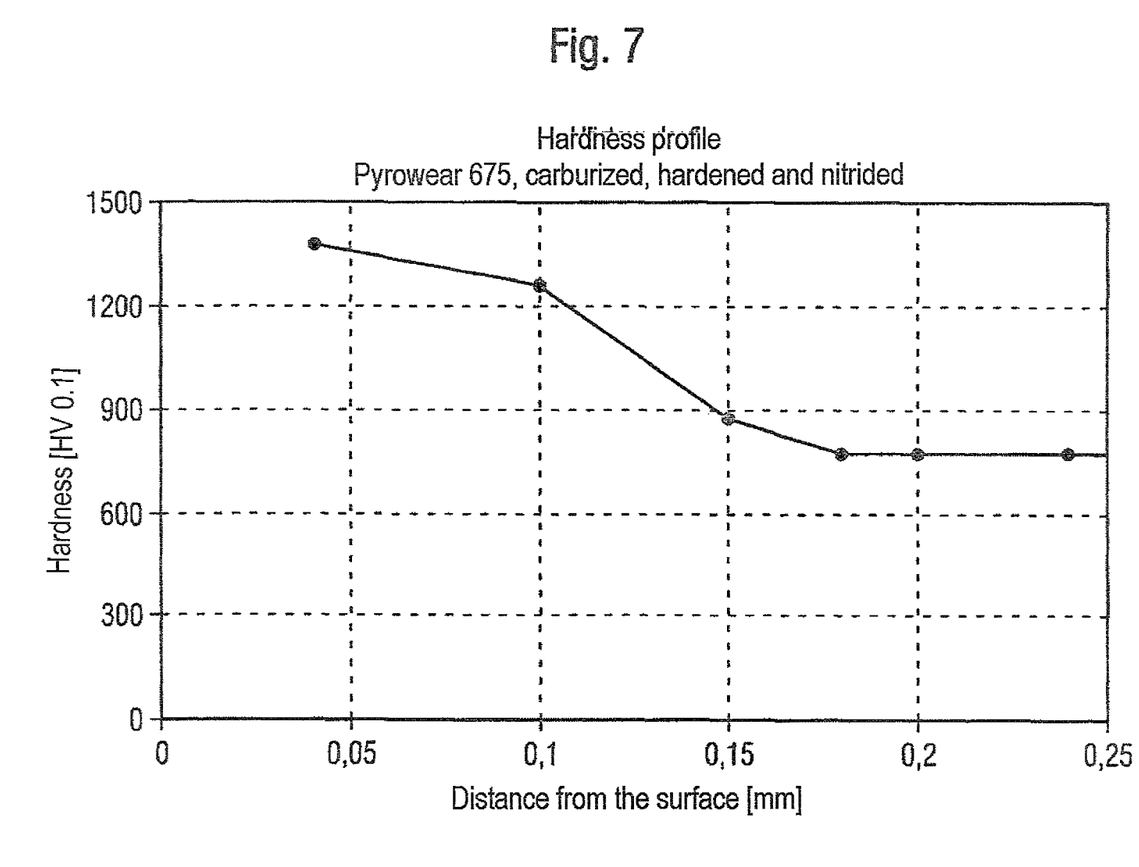
FIG. 7 shows the degree of hardness profile of a functional surface produced according to the second exemplary embodiment of the method according to the invention.

The Vickers hardness HV 0.1 of the bearing ring according to the second exemplary embodiment of the invention, plotted as a function of the distance [in mm] from the surface in FIG. 7, reveals that there is considerable hardening of the running surface or functional layer in the region of the nitriding zone (up to about 0.15 mm below the surface), which is well above 1000 HV 0.1 and whose maximum is about 1400 HV 0.1. Such hardening cannot be achieved merely by a carburizing and quenching treatment. Beyond about 0.15 mm below the running surface, there is still significant hardening due to the carburizing.

Figure 8:
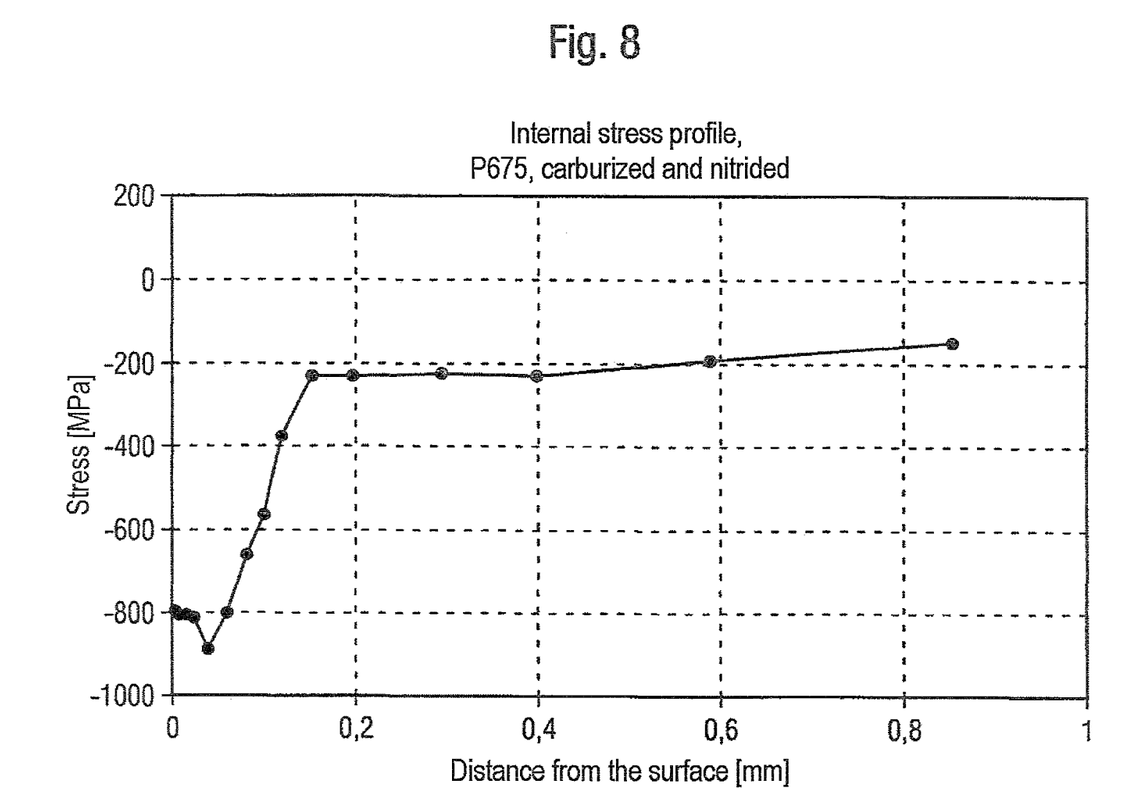
FIG. 8 shows the profile of the compressive internal stresses in this functional surface.

Lastly, FIG. 8 shows particularly impressively a greatly increased internal stress of the bearing ring produced according to the second exemplary embodiment of the invention, extending directly from the running surface and into a region at a distance of about 0.1 mm below the surface. Peak values of the compressive internal stress at about 900 MPa can be seen, which then return to the internal stresses of about 200 MPa that can typically be generated by carburizing and quenching.

Figure 9:
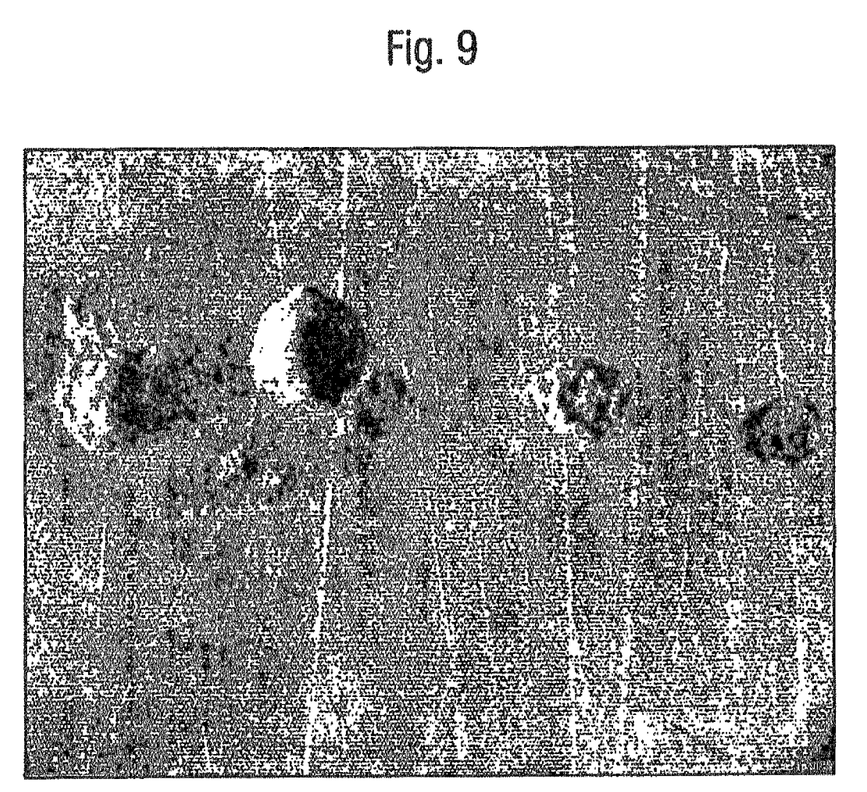
FIG. 9 shows usual pitting corrosion in a functional surface of a rolling bearing component, hardened according to the prior art.
Figure 10:
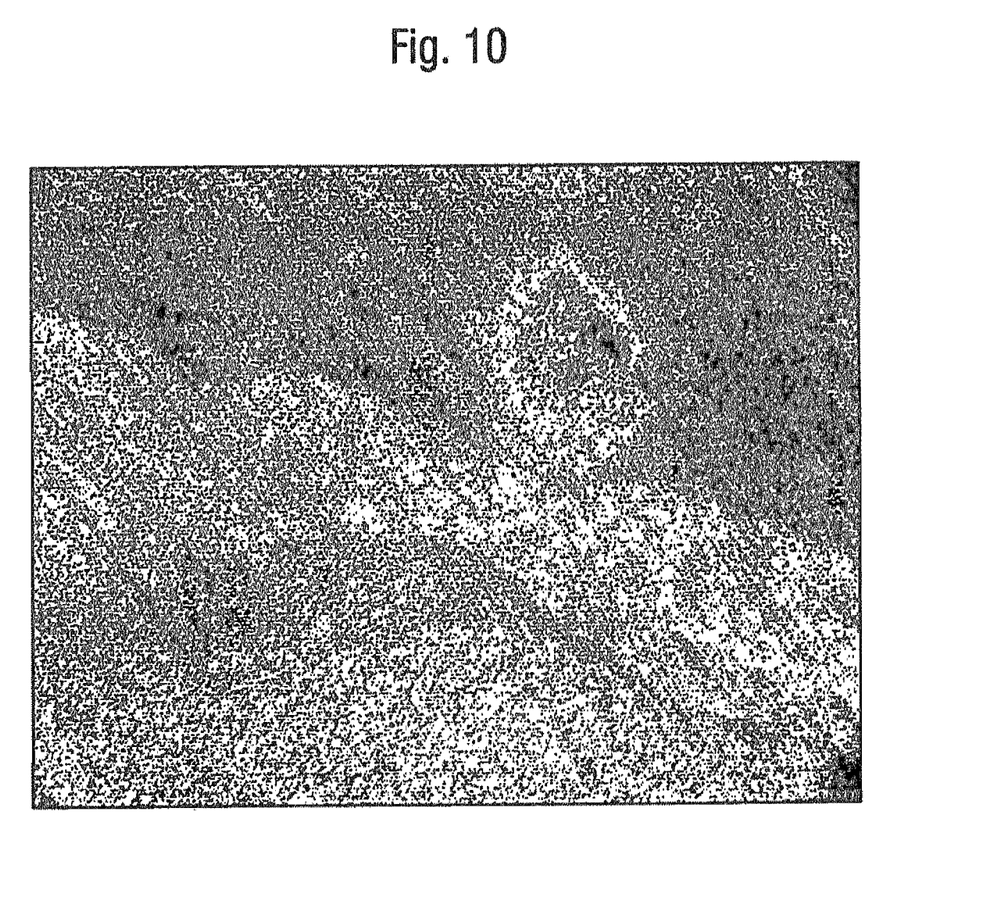
FIG. 10 shows corrosion in a functional surface of a rolling bearing component, produced according to the second exemplary embodiment of the invention.

FIGS. 9 and 10 show in comparison the substantially improved corrosion properties, in particular against so-called pit corrosion, on a bearing ring case-hardened by the method according to the invention.

FIG. 9 shows the corrosion on the surface of a functional layer hardened only by carburizing and subsequent quenching, with clearly visible, approximately circular pit-shaped recesses. Conversely, FIG. 10 shows the corrosion behavior of a functional layer treated according to the second exemplary embodiment of the invention. Although some corrosion can also be seen, advantageously the corrosive removal is however extraordinarily uniform. In summary it can be stated that a rolling bearing component made of high-alloy case-hardened steel, hardened by the method according to the invention, shows significantly improved corrosion behavior.

With the present invention, in particular, it is possible to provide rolling bearing rings for critical stressed uses, especially for applications in aviation and space flight, which permit and withstand high rolling and sliding stresses between the rolling bodies and the rolling body running surfaces even at high application temperatures and in an aggressively corrosive environment. The significant increase of the degree of hardness in the functional layer, which is typically less than 1000 HV after conventional methods, is particularly advantageous. The hardness achievable by conventional methods is moreover obtained at the cost of relatively large carbides, which undesirably reduce the rolling strength—and particularly in the high-tempered state—also lead to a significantly reduced corrosion resistance.

Conversely, the long-term nitriding according to the invention leads to a sufficiently thick, hard functional layer of 1000 HV or more and may be used both for a previously untreated case-hardened steel and for an already carburized and hardened case-hardened steel, improvements in the mechanical properties being achieved here with small distortion and an extremely low finishing requirement.

LIST OF REFERENCES 1 support
2 rolling bearing component (bearing ring)
3 running surface
4 functional layer
6 nitriding oven
7 oven wall
8 surface
10 glow discharge
12 polishing tool
21 support
22 rolling bearing component (bearing ring)
23 running surface
30 quenching bath
32 grinding head
50 line
51 line
52 line
60 aluminum layer (preparation aid)
61 low-carbide region
d internal diameter
d' diameter D external diameter
P1 first process gas
P2 second process gas
p pressure
t time
T temperature

The invention claimed is:

1. A method for hardening running surfaces of a rolling bearing component made of ease hardened steel, comprising:
plasma nitriding the rolling bearing component made of case hardened steel at a temperature of between 450° C. and 650° C. for a period of time of at least 50 hours and at most 100 hours and generating a hardened functional layer with stress profile starting at greater than 400MPa and is not transformed into an approximately stress free range until a thickness of greater than 0.15 mm,
wherein no carburizing takes place during the nitriding and no quenching subsequently takes place.

2. The method as claimed in claim 1, wherein the rolling bearing component is subjected to cleaning of a surface to be hardened before the nitriding.

3. The method as claimed in claim 2, wherein the cleaning is carried out by a surface bombardment with an inert gas at a pressure which is reduced relative to atmosphere.

4. The method as claimed in claim 3, wherein the cleaning is carried out in an over into which noble gas is initially introduced and a nitriding process gas is subsequently introduced.

5. The method as claimed in claim 1, wherein the running surfaces to be hardened are carburized before the nitriding.

6. The method as claimed in claim 5, wherein the roiling bearing component is processed to size before the nitriding.

7. The method of claim 1, wherein the plasma nitriding is conducted at a temperature between 500° C. and 650° C.

8. The method of claim 1, wherein the plasma nitriding is conducted for a period of time greater than 60 hours and at most 100 hours.

* * * * *

UNITED STATES PATENT AND TRADEMARK OFFICE
CERTIFICATE OF CORRECTION

PATENT NO.      : 8,479,396 B2
APPLICATION NO. : 12/302370
DATED           : July 9, 2013
INVENTOR(S)     : Streit et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this
Eighth Day of September, 2015

Michelle K. Lee
*Director of the United States Patent and Trademark Office*